(12) United States Patent
Lewis et al.

(10) Patent No.: US 7,933,463 B2
(45) Date of Patent: Apr. 26, 2011

(54) METHOD FOR REMOVING THE EFFECT OF LIGHT SCATTERING IN A DIGITIZED IMAGE OF A LIGHT-SCATTERING FILM

(75) Inventors: David F. Lewis, Monroe, CT (US); Loris Menegotti, Trento (IT); Anna Delana, Trento (IT)

(73) Assignee: ISP Investments Inc., Wilmington, DE (US)

( * ) Notice: Subject to any disclaimer, the term of this patent is extended or adjusted under 35 U.S.C. 154(b) by 929 days.

(21) Appl. No.: 11/836,389

(22) Filed: Aug. 9, 2007

(65) Prior Publication Data
US 2008/0089603 A1 Apr. 17, 2008

Related U.S. Application Data

(60) Provisional application No. 60/837,110, filed on Aug. 10, 2006.

(51) Int. Cl.
*G06K 9/40* (2006.01)
(52) U.S. Cl. .................................... 382/254; 382/274
(58) Field of Classification Search .................. 382/254, 382/274, 312; 358/1.9, 504, 505; 356/389, 356/390
See application file for complete search history.

(56) References Cited

U.S. PATENT DOCUMENTS

| 5,566,012 | A  | * | 10/1996 | Koshimizu et al. | 349/116 |
| 7,053,927 | B2 | * | 5/2006  | Jones et al.     | 348/97  |
| 7,272,257 | B2 | * | 9/2007  | Toba             | 382/162 |

* cited by examiner

*Primary Examiner* — Yon Couso
(74) *Attorney, Agent, or Firm* — William J. Davis; Thompson Hine LLP

(57) ABSTRACT

In accordance with the present invention, there is provided a method for removing the effect of light scattering in a digitized image of a light-scattering film comprising providing a light-scattering correction film that has a uniform optical density; providing a light scattering target film that has a pattern of optical densities; scanning the correction film with a film scanner to create a digital correction film image; scanning the target film with a film scanner to create a digital target film image; measuring the two-dimensional pattern of responses present in the digital correction film image; determining a correction function from the two-dimensional pattern of responses to correct for the effect of light scattering in the digital correction film image; and applying the correction function to the target film image to provide a corrected target film image.

13 Claims, 4 Drawing Sheets

METHOD FOR REMOVING THE EFFECT OF LIGHT SCATTERING IN A DIGITIZED IMAGE OF A LIGHT-SCATTERING FILM

CROSS-REFERENCE TO RELATED APPLICATIONS

The present application claims the benefit of U.S. Provisional Application Ser. No. 60/837,110 filed on Aug. 10, 2006, the disclosure of which is hereby incorporated by reference in its entirety.

BACKGROUND OF THE INVENTION

Film dosimetry is frequently used as a means for measuring 2-dimensional distributions of radiation dose. In the practice of medical radiotherapy, film dosimetry measurements are made for the quality assurance of radiation producing equipment as well as for the validation of therapeutic treatment plans prior to exposure of human patients to radiation sources.

A silver halide based dosimetry film responds to radiation exposure by developing a latent image. Upon development of the latent image a visual image is produced wherein the optical density at any point in the image is representative of the dose of radiation absorbed by the film. A radiochromic dosimetry film responds to radiation exposure by immediately developing a visible image wherein the optical density at any point in the image is representative of the dose of radiation absorbed by the film. One advantage of radiochromic film over silver halide film is that the former does not require post-exposure processing to develop a visible image.

One particular aspect of film dosimetry involves the measurement of a radiation-produced image in a film scanner. The film scanner produces a digital image of the dosimetry film. The digital image essentially describes the lightness or darkness of the film over an array of points and the film scanner is able to digitize the film image at high spatial resolution. While measurements of the film could be made with a manual densitometer, a scanner is the preferred method because it is able to measure a large area and make measurements at many points in a very short time period.

Film scanners of two basic types are in common usage. The first type employs a small beam of light to scan the film in a raster pattern. This type of scanner frequently uses a laser light source. The second type of scanner uses a large, diffuse light source to broadly illuminate the film and project an image of the film on a linear or 2-dimensional CCD array. Scanners of this second type are referred to as CCD scanners and are the ones most frequently used for film dosimetry. Representative examples are the Vidar VXR-16, Epson 1680 and the Microtek 9600XL.

GAFCHROMIC EBT dosimetry film is a radiochromic film used for film dosimetry. In measuring this film with CCD scanners it has been discovered that the measured response of the film is dependent on its position on the scanner. This parameter is characteristic of commercial CCD scanners such as Vidar VXR-16, Epson 1640XL, Epson 1680, Epson 4990, Epson V700, Epson 10000XL, Microtek 9800 and Microtek i900. In these scanners the light source is a linear fluorescent tube. What has been discovered is that the response of the EBT film varies with the position along the length of the light source. In general, the transmission of the film appears to be highest close to the center of the light source and lowest at the ends. In contrast, it has been found herein that when a piece of clear polyester is scanned on one of these scanners that the transmission of the film is essentially independent of position on the scanner.

In investigating these phenomena we have discovered that the variable response with the EBT film and other films that have a hazy appearance is at least in part a result of light scattering by the film. If a crystal-clear film is being measured, its response is independent of position, but if the film is hazy then the response varies with position. Since a crystal clear film does not scatter light, only certain light rays that are refracted through the film will be focused onto the CCD detector. The position-dependent response of a hazy film, for example GAFCHROMIC EBT dosimetry film, arises because, in addition to these refracted rays, a small proportion of other light rays that intersect the film over $2\pi$ space will be fortuitously scattered in the direction of the CCD array. Since the linear fluorescent light source has a finite length, the intensity of illumination at the center of the film will be greater than at the ends. Hence the contribution of scattered light to the total intensity of the image at the CCD detector will vary with position. Thus the transmission of a light-scattering film will appear to be highest at the center and lowest at the edges. Films that scatter light in this manner are referred to as light-scattering films.

The scanner output is proportional to the light intensity measured by the CCD. It is usual for the detected light intensity to be divided, over the dynamic range of the scanner, into $2^n$ levels where n is an integer. Earlier digital film scanners had $2^8$ levels and were commonly referred to as 8-bit scanners. Later models had $2^{12}$ levels. At present most scanners have 16-bits of digitization. That is, they measure light intensity over a $2^{16}$ dynamic range, i.e. there are 65536 levels between the highest and lowest intensities. Some scanners only have the ability to digitize an image in a single response channel. However, many scanners have the ability to produce digital images in multiple response channels. Thus a color scanner can provide a digitized image in three response channels, i.e., red, green and blue response channels. In addition these color scanners provide a grayscale response channel by combining the data in the three color response channels.

When digitizing a transparent film with a 16-bit film scanner, it is common to represent the highest intensity in the range by 65535 ($2^{16}-1$) and the lowest intensity (completely black) by 0. When scanning and measuring EBT dosimetry film in this way we discovered that we could make a first order correction for light scattering by scanning a piece of unexposed film, measuring the film response profile parallel to the linear light source, normalizing the response profile to the mean response and then using the normalized response profile to correct the positional variation in response of any other EBT film. This correction was found to work well, except when the film had become very dark because of high exposure to radiation, and/or the sides of the film were close to the edges of the scan area and hence were close to the ends of the linear light source.

SUMMARY OF THE INVENTION

What is described herein is a method for removing the effect of light scattering in a digitized image of a light-scattering film which includes the steps of providing a light-scattering correction film that has a uniform optical density; providing a light scattering target film that has a pattern of optical densities; scanning said correction film with a film scanner to create a digital correction film image; scanning said target film with a film scanner to create a digital target film image; measuring the two-dimensional pattern of responses present in said digital correction film image; determining a correction function from said two-dimensional pattern of responses to correct for the effect of light scattering in said digital correction film image; and applying said correction function to said target film image to provide a corrected target film image.

More particularly, the method comprises of providing a light-scattering film that has a uniform optical density; scanning said film with a film scanner and obtaining data in at least one response channel to create a $2^n$ bit digitized image where n is an integer and wherein the digitized value of $2^n$ represents the highest light intensity and the value 0 represents the lowest light intensity; inverting said $2^n$ bit digitized image by subtracting each pixel value within the image from $2^n$ to create an inverted image; plotting a profile of the inverted pixel values across the film and normalizing the profile; fitting said profile to a mathematical function that defines the normalized inverted pixel value $IPV_N(x)$ as a function of x, where x is the location of the pixel relative to the light source; scanning a target film that has a pattern of optical densities to create a $2^n$ bit digitized image where n is an integer and wherein the digitized value of $2^n$ represents the highest light intensity and the value 0 represents the lowest light intensity and inverting the $2^n$ bit digitized image by subtracting each pixel value within the image from $2^n$ to create an inverted target film image; determining the position x of each pixel in said inverted target film image in relation to the light source; and correcting said inverted target film image by dividing the pixel value of each pixel at position x in said inverted target film image by said normalized inverted pixel value $IPV_N(X)$ to create a corrected inverted target film image.

In one embodiment, the method includes a plurality of light-scattering correction films with different uniform optical densities scanned with a film scanner to create a plurality of digitized images; inverted to provide a plurality of inverted digitized images; plotted and normalized to provide a plurality of normalized profiles; said plurality of normalized profiles then combined to form an averaged normalized profile that is fitted to a mathematical function which is used to correct the inverted target film image. In the method, the mathematical function used to fit the profile is a polynomial function, e.g., a quadratic or parabolic function.

In another embodiment of the invention, the method comprises providing a light-scattering film that has a uniform optical density; scanning said film with a film scanner to create a $2^n$ bit digitized image in at least one response channel where n is an integer and wherein the digitized value of $2^n$ represents the highest light intensity and the value 0 represents the lowest light intensity; inverting said $2^n$ bit digitized image by subtracting each pixel value within the image from $2^n$ to create an inverted image; measuring the mean pixel value within said inverted image and dividing each pixel in the inverted image by the mean pixel value to create a normalized inverted image; scanning a target film that has a pattern of optical densities to create a $2^n$ bit digitized image where n is an integer and wherein the digitized value of $2^n$ represents the highest light intensity and the value 0 represents the lowest light intensity and inverting the $2^n$ bit digitized image by subtracting each pixel value within the image from $2^n$ to create an inverted target image; and correcting said inverted target image by dividing each pixel in the inverted target image by the corresponding pixel in said normalized inverted image to create a corrected target image.

Suitably, the light scattering film is a radiochromic film, which may contain a polyacetylene. A suitable film scanner is a CCD film scanner, e.g., an Epson Expression 1680 scanner.

DETAILED DESCRIPTION OF THE INVENTION

It was unexpectedly discovered that a complete correction based on a scan of any uniform EBT film could be obtained by inverting the intensity data for all the films. That is to say the scanner response data at each measurement point on a film was subtracted from 65535. In this inverted image, the response profile parallel to the linear light source was then measured and normalized to the mean response. Finally the normalized response profile was used to correct the positional variation in response of any other EBT film exposed to any degree of radiation dose.

Figure 1:
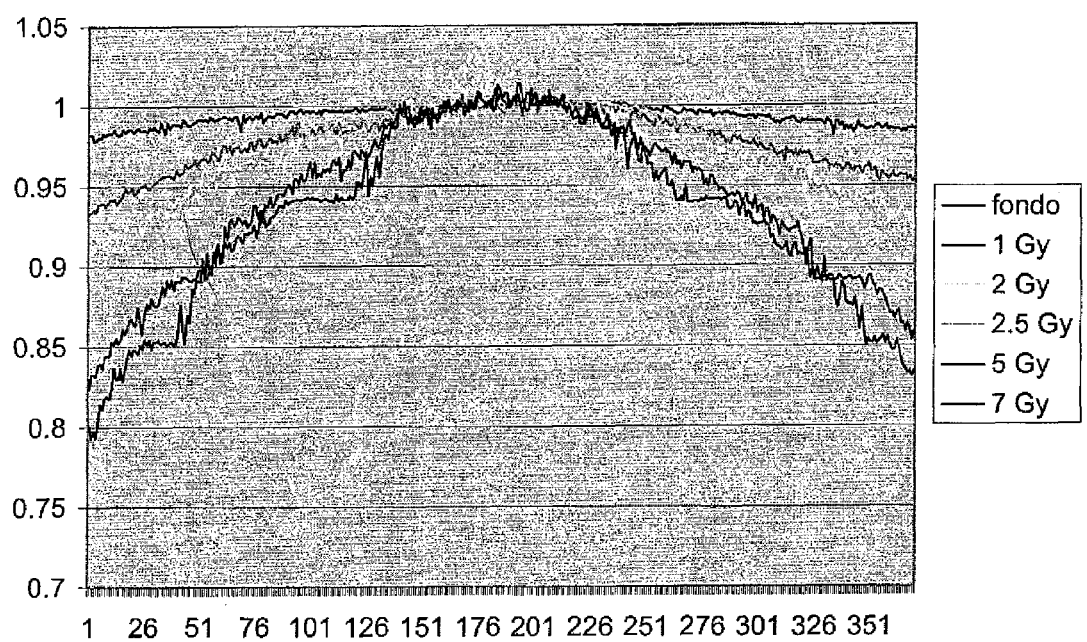
FIG. 1 is a graphical representation of a normalized film response parallel to the light source before data inversion.

The value of this correction derived from the inverted image can be seen by reference to two examples. FIG. 1 shows normalized intensity profiles for a series of GAFCHROMIC EBT films scanned on an Epson 1680 scanner. The intensity profiles are for the scanner response in the red color channel. The center of each of the films was positioned close to the center of the linear light source of the scanner. One of the films was unexposed and the others had been uniformly exposed to 6 MV x-rays at doses between 1 Gy and 7 Gy. Each of the profiles has been normalized to the mean response of a small section close to the center of that film. It can be seen that any method to correct for this non-uniform response has to account for the position on the film as well as the level of exposure dose to the film.

Figure 2:
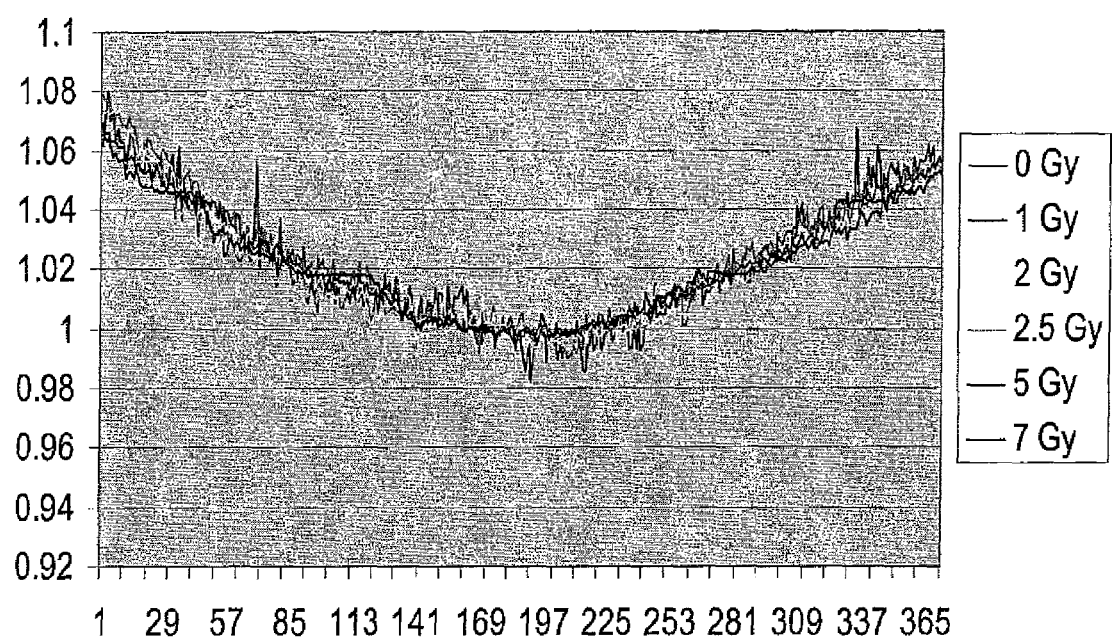
FIG. 2 is similar to FIG. 1 except the response is after data inversion.

FIG. 2 shows profiles for the same films, but the response data have been inverted by subtracting the original values from 65535. In the original response mode the highest light intensity is represented by 65535 and black (complete lack of intensity) is 0. In the inverted image, the highest light intensity is represented by 0 and black (complete lack of intensity) is 65535. It is readily apparent that the correction for response is dependent only on position and is independent of dose.

The correction of the digitized images of a light-scattering film can be implemented in a number of ways and is illustrated by the following method applied to 8"×10" sized GAFCHROMIC EBT films scanned on an Epson Expression 1680 scanner. In general, the method requires at least one piece of the EBT film that is either unexposed or has been uniformly exposed to a radiation source so as to develop a uniform color. These films are referred to as the "correction films".

A correction film is placed on the scanner with the 8" edges of the film parallel to the light source and the film centered with respect to the light source. The film is scanned in rgb mode (i.e. a full color image is obtained) to obtain an image with 16-bit digitization in each color channel. The 16-bit digital image in the red color channel is extracted. This 16-bit red channel image is inverted so that the highest light level is represented by a 0 and the lowest by 65535. The mean response value of the image is measured. The mean response value can be the mean response of substantially the entire image. Preferably the mean response is measured within a small area, say 5 cm×5 cm at the center of the image. The inverted image is then normalized by dividing the individual response values by the mean value. This image is referred to as the "normalized inverted image".

The method can be improved by scanning the correction film multiple times (e.g. five times) and averaging the scans before measuring the mean response and deriving the normalized inverted image. In addition, a noise reduction filter (e.g. a median filter or a Wiener filter) or smoothing filter can be applied to any of the images to reduce the effects of image artifacts such as those caused by dust or scratches on the film.

The profile of the normalized inverted image of the correction film is measured in the direction parallel to the light source. The profile may be taken over a width of 1 pixel, or preferably as the average value over a strip that is two, or more pixels wide. Most preferably the strip may extend almost to the top and bottom of the film. The profile is plotted as scanner response vs. position and the profile is fitted to a mathematical function that relates the scanner response to position. The mathematical function can be any function that closely fits the measured response-position data. The goodness of the fit can be determined by well known parameters such as the $R^2$ or chi-squared values. For example the $R^2$ value should be >0.90, preferably >0.95 and most preferably >0.99.

Examples of mathematical functions that have been found useful are polynomial functions and particularly second, third and fourth order polynomial functions. For example, quadratic functions of the form $y=ax^2+bx+c$ have been found to provide a good fit where y represents the scanner response value and x represents the position relative to the scanner light source and in the direction parallel to the light source. Special types of quadratic functions such as parabolic functions of the form $y=ax^2$ have been found to be particularly useful. Fitting of the mathematical function to the data determines the values of the coefficients of the mathematical expression, e.g. for a quadratic function, the fit determines the values of a, b and c.

If more than one correction film has been measured, the normalized inverted correction images can be averaged, or the values of the coefficients of the mathematical functions can be averaged to determine the correction function. The correction function can then be applied to other inverted EBT film images digitized on the same scanner.

Thus if the uncorrected response value at position x in the inverted image is $PV_x$ and the correction function was a quadratic function then the corrected value would be given by: $PV_x/(ax^2+bx+c)$ Another method of determining and applying a correction function is illustrated as follows. In FIG. 1 the normalized and un-inverted scanner response values, or pixel values, of the scanned films can be plotted with a parabola fitting. While this example considers a correction in one dimensional parallel to the light source, the method can also be applied in an analogous fashion to the two-dimensional case. The x axis denotes position relative to the light source in the direction parallel to the light source. The origin coincides with the center of the light source. I(x) denotes the value of a pixel, where x is the distance from the centre. The spatial dependence of the pixel values can be modelled by a parabola of the form $I(x)=I_0-ax^2$ where $I_0$ is the pixel value at the centre of the film (the "true" value, directly correlated to the uniform dose level of the film) and a is a positive coefficient describing the shape of the parabola.

Experimentally, the value of the coefficient a depends on the pixel value $PV_0$ of the film at x=0 prior to normalization, i.e. the shape of the parabola and the value of the coefficient a depends on the dose to which the film was exposed. This effect can be corrected by knowing the functional dependence of the coefficient a on the value $PV_0$, i.e. the function: $a=a(PV_0)$.

To perform the analysis it is convenient to convert the pixel values I(x) into their complementary or inverted value $I_c(x)$ by subtracting them from $2^n$, where n is the number of bits of digitization. In this case N=16, and $I_c(x)=2^{16}-I(x)$ By plotting the ratio between $I_c(x)$ and the central reference level $I_{c0}$ (where $I_{c0}=2^{16}-I_0$) it is possible to see that the plots corresponding to different doses are coincident as shown in FIG. 2. We obtain then a function of the form:

$$\frac{Ic(x)}{Ic_0} = 1 + \left(\frac{a(I_0)}{Ic_0}\right)x^2$$

where the coefficient ($a(I_0)/Ic_0$) does not to depend on $I_0$. That is, the coefficient is independent of dose.

The behaviour is understood by plotting the dependence of the coefficient $a(I_0)$ as a function of $Ic_0$. That is, analysis of the dependence of the shape of the parabolic of the profiles shown in FIG. 1 as a function of the complementary central pixel value $PV_{c0}$. This is shown in FIG. 3.

Figure 3:
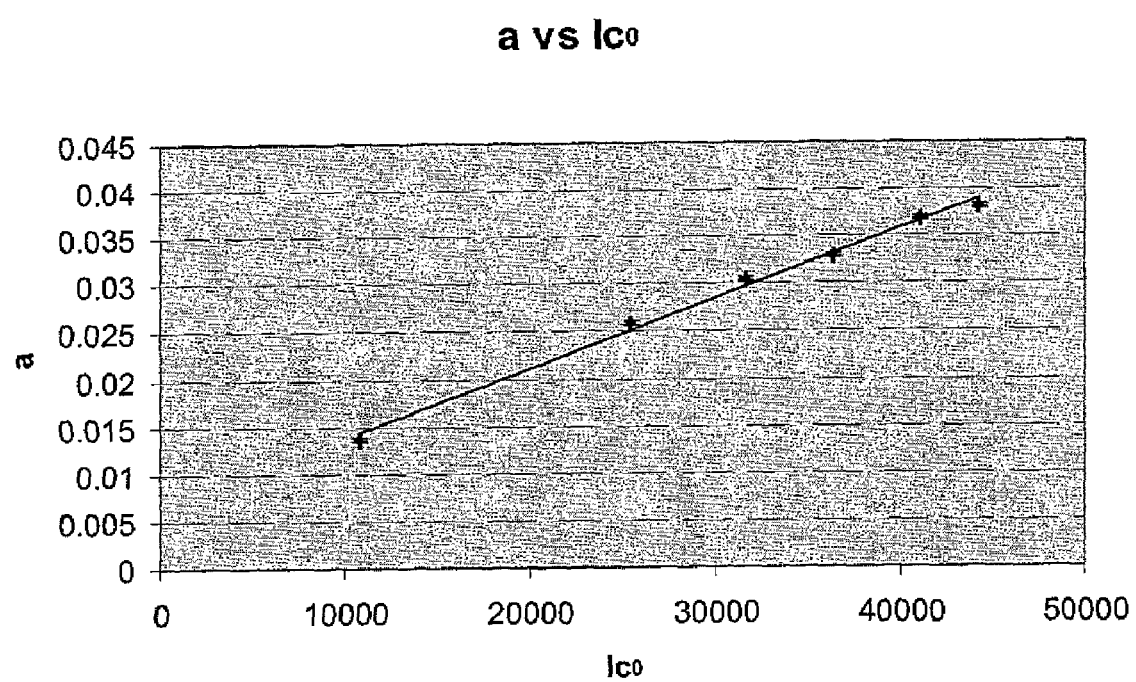
FIG. 3 is a graphical representation of the dependence of the Parabolic Coefficient $a(I_0)$ on the Inverted Pixel Value $PV_{c0}$.

The plot in FIG. 3 shows that $a(I_0)$ is proportional to $Ic_0$ and can be approximated by the linear fit $a(I_0)=k\ Ic_0$ where k is a constant independent of the darkness of the film or the dose level $I_0$.

The value of k is determined by scanning and measuring a number of uniformly irradiated EBT films. Having thus determined the value of k, the correction of any EBT film images for the effects of light scattering in the scanner is straightforward. For a pixel with a value I(x) at a distance x from the center of the light source is given by:

$$Iv(x) = 2^{16} - \frac{(2^{16} - I(x))}{(1 + kx^2)}$$

A third method of correction is described. An unexposed GAFCHROMIC EBT film was digitized on an Epson 1680 scanner as a 48-bit rgb image. The 16-bit image in the red color channel was extracted. The red channel image was inverted by subtracting the pixel values from $2^{16}$. The mean pixel value within a 5 cm×5 cm area at the center of the inverted image was measured and the inverted image was normalized by dividing the pixel values in the inverted image by the mean pixel value. This normalized image is called the "correction image".

Figure 4:
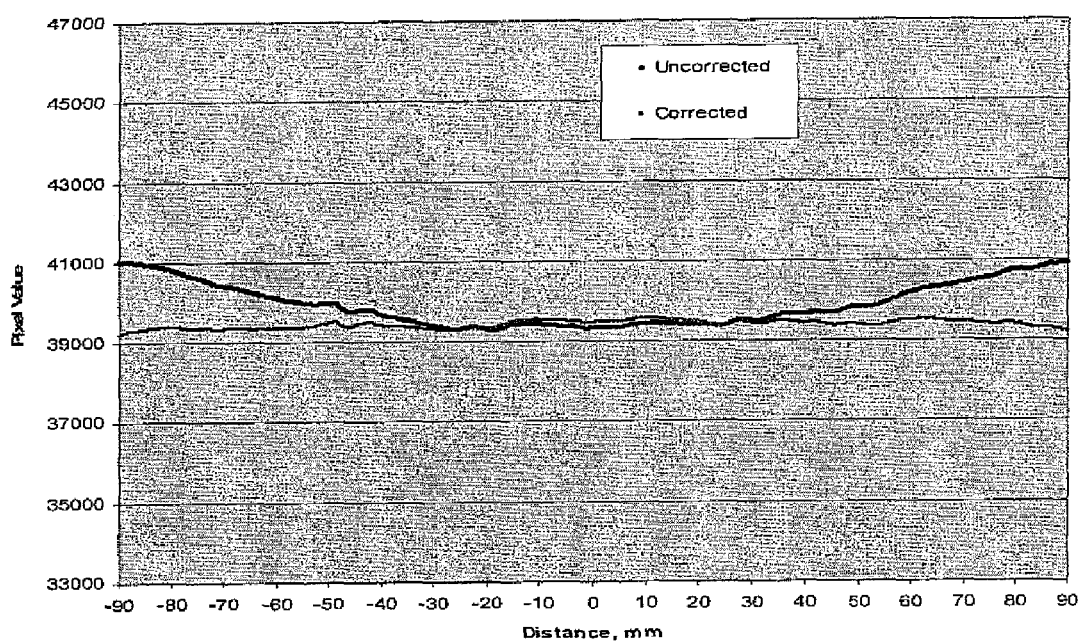
FIG. 4 shows the film response profiles across uncorrected and corrected images.

A second EBT film uniformly exposed to about 350 cGy was similarly scanned and the inverted red channel image was extracted. The film response profile of the inverted image is shown as the "Uncorrected" profile in FIG. 4. The inverted image of the uniformly exposed film was then corrected by dividing each pixel value in the image by the pixel value of the corresponding pixel in the correction image. The corrected response profile is shown in as the "Corrected" profile in FIG. 4. While the profile of the "Uncorrected" film shows that the film response changes with position along the light source, the pixel values in the "Corrected" are almost independent of position.

This third method can be improved by scanning the correction film multiple times (e.g. five times) and averaging the scans before measuring the mean response and deriving the normalized inverted image. In addition, a noise reduction filter (e.g. a median filter or a Wiener filter) can be applied to any of the images to reduce the effects of image artifacts such as those caused by dust or scratches on the film.

Another improvement in the third method can be obtained by scanning one or more uniformly exposed films in addition to the unexposed film. Optionally a noise reduction filter (e.g. a median filter or a Wiener filter) or a smoothing filter can be applied to any of the images to reduce the effects of image artifacts such as those caused by dust or scratches on the film. A correction image is then calculated by averaging the individual correction images for each of the films.

While the invention has been described with particular reference to certain embodiments thereof, it will be understood that changes and modifications may be made which are within the skill of the art.

What is claimed:

1. A method for removing the effect of light scattering in a digitized image of a light-scattering film comprising:
   a) providing a light-scattering correction film that has a uniform optical density;
   b) providing a light scattering target film that has a pattern of optical densities;
   c) scanning said correction film with a film scanner to create a digital correction film image;
   d) scanning said target film with said film scanner to create a digital target film image;
   e) measuring the two-dimensional pattern of responses present in said digital correction film image;
   f) determining a correction function from said two-dimensional pattern of responses to correct for the effect of light scattering in said digital correction film image; and
   g) applying said correction function to said target film image to provide a corrected target film image.

2. The method of claim 1 wherein said light scattering film is a radiochromic film.

3. The method of claim 1 wherein said light-scattering film is a radiochromic film and said light scattering target film has a pattern of optical densities created by exposing said target film to doses of actinic radiation.

4. The method of claim 2 wherein said radiochromic film contains a polyacetylene.

5. The method of claim 1 wherein said film scanner is a CCD film scanner.

6. The method of claim 1 wherein said film scanner is a laser scanner.

7. The method of claim 1 further comprising:
   a) obtaining data in at least one response channel of said film scanner to create a $2^n$ bit digitized image where n is an integer and wherein the digitized value of $2^n$ represents the highest light intensity and the value 0 represents the lowest light intensity;
   b) inverting said $2^n$ bit digitized image by subtracting each pixel value within the image from $2^n$ to create an inverted image;
   c) plotting a profile of the inverted pixel values across the film and normalizing the profile;
   d) fitting said profile to a mathematical function that defines the normalized inverted pixel value $IPV_N(x)$ as a function of x, where x is the location of the pixel relative to the light source;
   e) scanning said target film to create a $2^n$ bit digitized image where n is an integer and wherein the digitized value of $2^n$ represents the highest light intensity and the value 0 represents the lowest light intensity;
   f) inverting the $2^n$ bit digitized image by subtracting each pixel value within the image from $2^n$ to create an inverted target film image;
   g) determining the position x of each pixel in said inverted target film image in relation to the light source; and
   h) correcting said inverted target film image by dividing the pixel value of each pixel at position x in said inverted target film image by said normalized inverted pixel value $IPV_N(x)$ to create a corrected inverted target film image.

8. The method of claim 7 wherein a plurality of light-scattering correction films with different uniform optical densities are:
   a) scanned with a film scanner to create a plurality of digitized images;
   b) inverted to provide a plurality of inverted digitized images;
   c) plotted and normalized to provide a plurality of normalized profiles; and
   d) said plurality of normalized profiles are then combined to form an averaged normalized profile that is fitted to said mathematical function which is used to correct the inverted target film image.

9. The method of claim 8 wherein said mathematical function is a polynomial function.

10. The method of claim 9 wherein said polynomial function is a quadratic function.

11. The method of claim 10 wherein said quadratic function is a parabolic function.

12. The method of claim 1 further comprising:
   a) creating a $2^n$ bit digitized image in at least one response channel of said film scanner where n is an integer and wherein the digitized value of $2^n$ represents the highest light intensity and the value 0 represents the lowest light intensity;
   b) inverting said $2^n$ bit digitized image by subtracting each pixel value within said image from $2^n$ to create an inverted image;
   c) measuring the mean pixel value within said inverted image and dividing each pixel in the inverted image by the mean pixel value to create a normalized inverted image;
   d) scanning said target film to create a $2^n$ bit digitized image where n is an integer and wherein the digitized value of $2^n$ represents the highest light intensity and the value 0 represents the lowest light intensity;
   e) inverting said $2^n$ bit digitized image by subtracting each pixel value within said image from $2^n$ to create an inverted target image; and
   f) correcting said inverted target image by dividing each pixel in the inverted target image by the corresponding pixel in said normalized inverted image to create a corrected target image.

13. The method of claim 1 wherein said light-scattering correction film has a pattern of optical densities parallel in one direction and variable in the orthogonal direction.

* * * * *